United States Patent Office 2,758,872
Patented Aug. 14, 1956

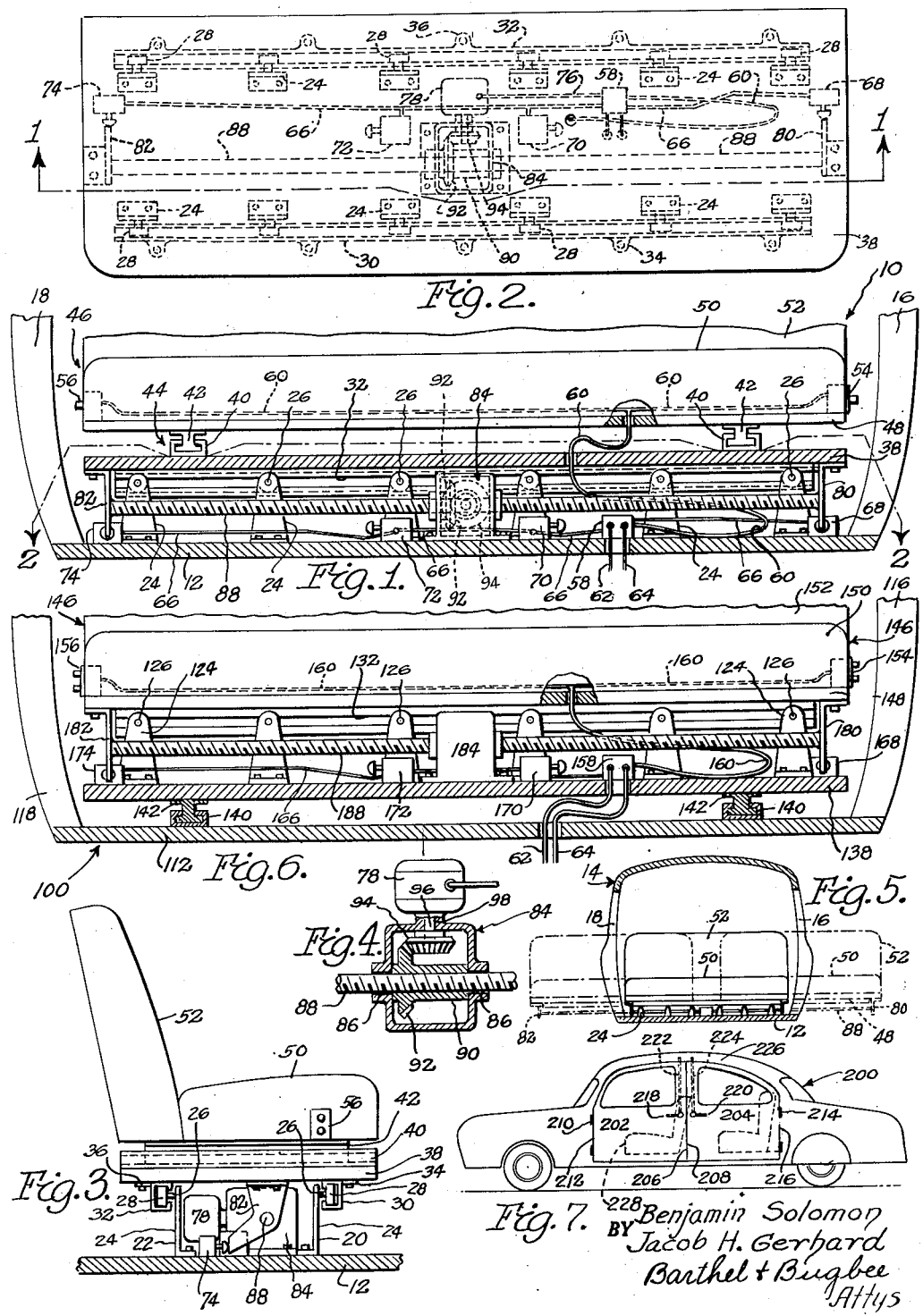

2,758,872

LATERALLY-MOVABLE VEHICLE SEAT THROUGH DOORWAY

Benjamin Solomon and Jacob H. Gerhard, Detroit, Mich.

Application July 9, 1953, Serial No. 366,946

4 Claims. (Cl. 296—65)

This invention relates to vehicles and, in particular, to vehicles with movable seats.

One object of this invention is to provide a vehicle body with a laterally-movable seat adapted to travel outwardly and inwardly through an open doorway of the body so as to assist an aged, crippled or infirm person to enter or leave the vehicle.

Another object is to provide a vehicle body with a laterally-movable seat of the foregoing character wherein the seat is reciprocated laterally through the body doorway so as to project a sufficient distance for a person outside the vehicle to sit upon the projecting portion of the seat and thereafter be moved through the doorway into the interior of the vehicle body by reciprocating the seat reversely through the doorway.

Another object is to provide a vehicle body with a laterally-movable seat of the foregoing character wherein the seat is reciprocable laterally in either of two opposite directions so as to travel outwardly or inwardly through either the driver's or passenger's doorway, thereby enabling an infirm or crippled driver to take advantage of the invention, as well as an infirm or crippled passenger to do so.

Another object is to provide a vehicle body with a laterally-movable seat of the foregoing character wherein the laterally-movable seat is also provided with mechanism for adjusting the seat forwardly or rearwardly of the vehicle body.

Another object is to provide a vehicle body with a laterally-movable seat of the foregoing character, the seat being either a front or a rear seat of the vehicle.

Other objects and advantages of the invention will become apparent during the course of the following description of the accompanying drawings, wherein:

Figure 1 is a vertical cross-section through a vehicle body equipped with a laterally-reciprocable front seat, according to one form of the invention, taken along the line 1—1 in Figure 2, with the bottom cushion portion of the seat in front elevation;

Figure 2 is a top plan view of the front seat of a vehicle body equipped for lateral reciprocation through the body doorways according to one form of the invention;

Figure 3 is a side elevation of the vehicle seat shown in Figure 1;

Figure 4 is a detailed view of the operating motor and nut for actuating the reciprocable seat construction shown in Figures 1 to 3 inclusive;

Figure 5 is a diagrammatic cross-section, in reduced size, through a vehicle equipped with the laterally-sliding seat of the present invention, showing its extended positions in dotted lines;

Figure 6 is a vertical section similar to Figure 1, but showing a modified construction; and Figure 7 is a side elevation of a motor vehicle equipped with a laterally-reciprocable seat according to the present invention, wherein the body is constructed without door posts so that the back of the reciprocable seat is not impeded thereby in being reciprocated through the doorway.

Referring to the drawings in detail, Figures 1 to 5 inclusive show a laterally-movable seat assembly, generally designated 10, according to one form of the invention as mounted upon the floor 12 of an automobile or other vehicle body, generally designated 14, having front door openings or doorways 16 and 18 on the driver's and passenger's sides respectively. The doors themselves are not shown, being removed for clearness and simplicity of showing, it being understood that the doors, their hinges and their mode of mounting in the doorways 16 and 18 are conventional.

Bolted or otherwise secured to the floor 12 in paths extending across the vehicle between the opposite sides thereof are parallel forward and rearward rows 20 and 22 of angle brackets 24. The angle brackets 24 in both rows are of the same construction but face in opposite directions (Figure 3). Projecting from the upper end of each angle bracket 24 is an axle 26 upon which a roller 28 is rotatably mounted. The axles 26 and rollers 28 of the angle brackets 24 in the forward and rearward rows 20 and 22 thus face in opposite directions and the rollers 28 thereof are seated in and travel along parallel forward and rearward guide channel rails 30 and 32 having flanges 34 and 36 respectively by which they are bolted or otherwise secured to the underside of a platform or base 38. The channel guide rails 30 and 32 are arranged transversely across the vehicle, so that the platform 38 slides transversely into and out of either door opening 16 or 18.

Bolted or otherwise secured to the top of the platform 38 in laterally-spaced parallel relationship are two longitudinal channel guide rails 40, these extending in a forward and rearward or fore-and-aft direction parallel to the center line of the vehicle body 14. Seated in and slidably engaging the guide rails 40 are slides 42 which with the guide rails 40 form a forward and rearward seat adjustment, generally designated 44. The seat adjustment 44 is shown only broadly because it is conventional and its details are outside the scope of the present invention. It serves the purpose of enabling the vehicle seat unit, generally designated 46, to be moved backward or forward, so as to place the steering wheel and foot pedals within the most comfortable and convenient reach of the particular driver.

The slides 42 are bolted or otherwise secured to the underside of the base 48 of the seat unit 46. The base 48 supports the seat cushion 50 and back cushion 52, both of which are of any suitable design, the details of which are outside the scope of the present invention. The seat cushion 50 at its opposite end carries a pair of manual control reversing switches 54 and 56 arranged adjacent the door openings 16 and 18 respectively. These are connected to one another and to a relay 58 by a multi-conductor flexible cable 60. The relay 58, which is of conventional construction, is supplied with current from the vehicle storage battery (not shown) through conductors 62 and 64 (Figure 1). Also connected to the relay 58 is a multi-conductor cable 66 leading to limit switches 68, 70 72 and 74 respectively (Figure 2). The relay 58 controls the supply of current from the conductors 62, 64 to a multi-conductor cable 76 leading therefrom to a reversible electric motor 78 by which the seat assembly 10 is moved to and fro by power, under the control of the limit switches 68, 70, 72 and 74 and the manual reversing switches 54 and 56. The limit switches 68 and 70 are actuated by an arm 80 of angle construction bolted to the underside of one end of the platform 38 adjacent the door opening 16, whereas the limit switches 72 and 74 are similarly actuated by an arm 82 of angle construction similarly bolted to the underside of the platform 38 but located at the opposite end thereof adjacent the door opening 10, as explained more fully below in connection with the operation of the invention.

The motor 78 is mounted on one side of a gear box 84 (Figures 3 and 4), the bottom of which is bolted or otherwise secured to the vehicle body floor 12. The gear box 84 on its opposite sides is provided with aligned bores 86 through which passes a non-rotatable screw shaft 88, the opposite ends of which are secured, as by welding, to the arms 80 and 82 respectively. Threaded upon the screw shaft 88 is an internally-threaded sleeve-like nut 90 (Figure 4) forming the hub of a bevel gear 92 rotatably mounted within the gear box 94 and having thrust engagement against the inside walls thereof. Meshing with the bevel gear 92 is a bevel pinion 94 mounted on the motor shaft 96 and drivingly secured thereto. The motor shaft 96 is journaled in a bearing bore 98 in a third side wall of the housing 84, the bores 86 and 98 being located in bosses integral with the gear box 84.

In the operation of the form of the invention shown in Figures 1 to 5 inclusive, let it be assumed that the conductors 62 and 64 are connected to the storage battery circuit of the vehicle so as to receive electricity therefrom. If an infirm or crippled passenger wishes to be assisted in entering the vehicle body 14 more easily, he opens the door normally closing the door opening 18 and shifts the reversing switch 56. This energizes the relay 58 through the flexible cable 60, causing the motor 78 to be supplied with current from the conductors 62, 64 through the relay 58 and the cable 76. This in turn causes the motor shaft 96 to rotate the threaded nut 90 in a clockwise direction (as viewed from the left-hand end of Figure 1), so that the screw shaft 88 travels through the rotating nut 90 to the left, carrying with it the platform 38 to which its brackets 80 and 82 are attached, and causing the seat unit 46 to travel to the left and outward through the door opening 18, as shown at the left-hand side of Figure 5. The passenger then seats himself upon the projecting end of the seat unit 46 and operates the switch 56 in a reverse direction, reversing the motor 78, causing the nut 90 to rotate in the opposite or counterclockwise direction, so that the screw shaft 88 moves to the right and thereby carries the door unit 46 back into the interior of the body 14. The outward travel of the seat unit 46 is terminated when the lower end of the arm 80 engages and operates the limit switch 70 and its inward travel is terminated when the lower end of the arm 82 engages and operates the limit switch 74.

If, on the other hand, the driver is infirm or crippled and wishes to be assisted by the invention, he stands beside the door opening 16 and operates the reversing switch 54 to energize the motor 78 to cause the nut 90 to rotate in such a manner as to cause the screw shaft 88, platform 38 and seat unit 46 attached thereto to move to the right (Figure 1) and to pass outward partway through the door opening 16, as shown at the right-hand end of Figure 5, travel of the seat unit 46 being terminated by the engagement of the arm 82 with the limit switch 72. The driver, like the passenger mentioned above, seats himself on the outwardly-projecting portion of the seat unit 46 and then actuates the reversing switch 54 in a reverse direction to reverse the direction of rotation of the motor 78 and cause the screw shaft 88 and seat unit 46 to return to its original position inside the vehicle body 14, halted by the engagement of the arm 80 with the limit switch 68.

While the platform 38 is moving to and fro under the action of the rotating nut 40 engaging the non-rotating screw shaft 88, the platform 38 and the seat unit 46 supported thereby are guided in their travel by the rollers 28 on the upper ends of the brackets 20 and 22 (Figure 3) engaging the channel members 30 and 32. If the operator wishes, in addition, to adjust the seat unit 46 back and forth relatively to the steering wheel and foot pedals, he does so by the conventional mechanism 44 illustrated diagrammatically by the slides 42 engaging the longitudinally-mounted channels 40 on top of the platform 38.

The modified laterally-movable seat assembly, generally designated 100, shown in Figure 6, is similar in principle, construction and mode of operation to the form of the invention shown in Figures 1 and 2, and differs from it in the relative location of the longitudinal seat-adjusting mechanism 44. Consequently, similar parts in Figure 6 are designated with the same reference numerals as in Figures 1 to 4 inclusive, increased by one hundred. In Figure 6, the platform 138 does not reciprocate laterally, but is supported on the longitudinal slides 142 engaging the channel tracks 140 which here are mounted directly upon the floor 112. On the other hand, the parts previously supported directly on the floor 12 in Figures 1 to 4 inclusive, such as the brackets 20, 22, motor 78, reduction gear box 84, limit switches 68, 70, 72 and 74, and relay 58 are now mounted on the platform 138 and hence designated by the same reference numerals, increased by one hundred. In Figure 6, moreover, the arms 180 and 182 are attached directly to the base 148 of the seat unit 146, as are also the guide channel rails 130 and 132 (only the latter being shown in Figure 6).

The operation of the modification shown in Figure 6 is analogous to that described in connection with the form of the invention shown in Figures 1 to 5 inclusive, and hence requires no repetition. In Figure 6, the platform 138 remains stationary when the switches 154 or 156 are manipulated, and the seat unit 146 consisting of the seat cushion 150 and back cushion 142 together with its guide rails 130 and 132 are substantially the only traveling parts, except, of course, the arms 180, 182 and screw shaft 188 bolted to the seat base 148. Adjustment of the seat unit 146 back and forth relatively to the steering wheel and foot pedals is accomplished by moving the entire assembly from the platform 138 upward instead of merely moving the seat base 48, seat cushion 50 and back cushion 52 as in Figures 1 to 5 inclusive.

In certain designs of automobile bodies of the four-door sedan type, it may be found that the door post between the front and rear doors interfers with the lateral travel of the seat unit 46 or 146 into and out of the door opening. In such instance, it is of course possible to keep the seat back 52 or 152 stationary by mounting it directly upon the floor 12 in Figure 1 or platform 138 in Figure 6, and to move only the seat cushion 50 laterally to and fro. In such instance, the passenger or driver in using the invention bends slightly forward to avoid engagement of his back with the back cushion 52 or 152 while the seat cushion 50 or 150 is traveling to and fro.

The modification shown in Figure 7, however, provides a vehicle body, generally designated 200, so designed with front and rear doors 202 and 204 directly engaging one another at their adjacent vertical edges 206 and 208 respectively, without the interposition of a door post. The forward door 202 is hinged as at 210 at its forward edge 212, whereas the rearward door 204 is hinged as at 214 at its rearward edge 216, and latch mechanisms 218 and 220 for the forward and rearward doors 202 and 204 respectively are provided for engaging a portion of the vehicle body 200 other than the door post—for example, by rods or vertical bolts 222, 224 engaging the vehicle roof structure 226 or the framework thereof. It will be evident from Figure 7 that the vertical bolts 222, 224 would alternatively engage the portion of the vehicle body 201 below the doors 202, 204 or could engage the body portions both above and below the doors 202 and 204, as desired.

In the operation of the modification shown in Figure 7, in order, for example, for the driver to move the front seat unit 228 outside the vehicle, he operates both the door locking mechanism 218 and 220 on his side of the vehicle in order to open both doors 202 and 204. He then operates the adjacent switch 54 or 154 described in connection with Figures 1 and 6 so as to cause the seat unit 228 to move outward toward him through the aperture thus provided by opening both doors 202 and 204.

What I claim is:

1. A laterally-extensible seat construction adapted to be projected through the aligned doorways at the opposite sides of a vehicle body floor, said construction comprising a supporting structure disposed transversely across said vehicle and extending between said doorways, a seat structure of multiple-passenger width mounted above said supporting structure in spaced parallel relationship therewith, a guideway disposed transversely to the longitudinal axis of said vehicle body in line with said doorways and secured to one of said structures, the other structure having sustaining elements secured thereto in engagement with said guideway, a motor, seat-traversing mechanism operatively connecting said motor to said seat structure for moving a portion of said seat structure of at least single-passenger width laterally of said vehicle body through at least one of said doorways, and a motor control circuit connected to said motor, said guideway including means for holding down the portion of said seat structure remaining inside said vehicle body during outward projection of the remainder thereof whereby to prevent tilting of said seat structure while supporting said seat structure in cantilever relationship to said floor during projection of said seat structure laterally of said body through said doorway.

2. A laterally-extensible seat construction adapted to be projected through the aligned doorways at the opposite sides of a vehicle body door, said construction comprising a supporting structure disposed transversely across said vehicle and extending between said doorways, a seat structure of multiple-passenger width including a platform mounted above said supporting structure in spaced parallel relationship therewith, a guideway disposed transversely to the longitudinal axis of said vehicle body in line with said doorways and secured to one of said structures, the other structure having sustaining elements secured thereto in engagement with said guideway, a motor, seat-traversing mechanism operatively connecting said motor to said seat structure for moving a portion of said seat structure of at least single-passenger width laterally of said vehicle body through at least one of said doorways, and a motor control circuit connected to said motor, said guideway including means for holding down the portion of said seat structure remaining inside said vehicle body during outward projection of the remainder thereof whereby to prevent tilting of said seat structure while supporting said seat structure in cantilever relationship to said floor during projection of said seat structure laterally of said body through said doorway.

3. A laterally-extensible seat construction adapted to be projected through the aligned doorways at the opposite sides of a vehicle body door, said construction comprising a platform mounted above said floor, said platform being disposed transversely across said vehicle and extending between said doorways, a seat structure of multiple-passenger width mounted above said platform in spaced parallel relationship therewith, a guideway disposed transversely to the longitudinal axis of said vehicle body in line with said doorways and secured to said floor, said platform having sustaining elements secured thereto in engagement with said guideway, a motor, seat-traversing mechanism operatively connecting said motor to said seat structure for moving a portion of said seat structure of at least single-passenger width laterally of said vehicle body through at least one of said doorways, and a motor control circuit connected to said motor, said guideway including means for holding down the portion of said seat structure remaining inside said vehicle body during outward projection of the remainder thereof whereby to prevent tilting of said seat structure while supporting said seat structure in cantilever relationship to said floor during projection of said seat structure laterally of said body through said doorway.

4. A laterally-extensible seat construction adapted to be projected through the aligned doorways at the opposite sides of a vehicle body floor, said construction comprising a platform disposed transversely across said vehicle and extending between said dorways, a seat structure of multiple-passenger width mounted above said platform in spaced parallel relationship therewith, a guideway disposed transversely to the longitudinal axis of said vehicle body in line with said doorways and secured to said seat structure, said platform having sustaining elements secured thereto in engagement with said guideway, a motor, seat-traversing mechanism operatively connecting said motor to said seat structure for moving a portion of said seat structure of at least single-passenger width laterally of said vehicle body through at least one of said doorways, and a motor control circuit connected to said motor, said guideway including means for holding down the portion of said seat structure remaining inside said vehicle body during outward projection of the remainder thereof whereby to prevent tilting of said seat structure while supporting said seat structure in cantilever relationship to said floor during projection of said seat structure laterally of said body through said doorway.

References Cited in the file of this patent

UNITED STATES PATENTS

| 2,311,972 | Simpson | Feb. 23, 1943 |
| 2,587,679 | Atkinson | Mar. 4, 1952 |
| 2,588,165 | Rossmann | Mar. 4, 1952 |
| 2,670,987 | Walsh | Mar. 2, 1954 |

FOREIGN PATENTS

| 400,486 | Great Britain | Oct. 26, 1933 |